(12) United States Patent
Zhang

(10) Patent No.: US 11,385,892 B1
(45) Date of Patent: Jul. 12, 2022

(54) OPTIMAL SOFTWARE ARCHITECTURE RECOMMENDATIONS BY AN APPLICATION MODERNIZATION SERVICE

(71) Applicant: Amazon Technologies, Inc., Seattle, WA (US)

(72) Inventor: Jiangtao Zhang, Pleasanton, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/037,075

(22) Filed: Sep. 29, 2020

(51) Int. Cl.
*G06F 8/76* (2018.01)
*G06F 8/71* (2018.01)
*G06F 16/9535* (2019.01)
*G06F 9/54* (2006.01)

(52) U.S. Cl.
CPC .................. *G06F 8/76* (2013.01); *G06F 8/71* (2013.01); *G06F 9/547* (2013.01); *G06F 16/9535* (2019.01)

(58) Field of Classification Search
USPC ......................................................... 717/121
See application file for complete search history.

(56) References Cited

U.S. PATENT DOCUMENTS

| | | | |
|---|---|---|---|
| 2012/0137240 A1 | 5/2012 | Krueger | |
| 2012/0265507 A1 | 10/2012 | Carbajales et al. | |
| 2017/0097820 A1* | 4/2017 | Lategan | G06F 8/70 |
| 2019/0253485 A1* | 8/2019 | Jyoti Banerjee | H04L 67/1097 |

OTHER PUBLICATIONS

Notice of Allowance, U.S. Appl. No. 17/109,359, Dec. 21, 2021, 9 pages.

* cited by examiner

*Primary Examiner* — John Q Chavis
(74) *Attorney, Agent, or Firm* — Nicholson De Vos Webster & Elliott LLP

(57) ABSTRACT

Techniques are described for enabling an application modernization system to identify a recommended modernized software application architecture for a software application undergoing software modernization processes. An application modernization service enables the identification of subunits of the software application, where each subunit represents a defined subset of the software application's source code that can be implemented as an independent software application unit. The application modernization tools further enable the collection and generation of application profile data describing dependencies among the identified subunits and static and dynamic performance information for the subunits. An application modernization service provides an application programming interface (API) that enables users and applications to request the identification of a recommended software application architecture based on input identifying a software application's subunits, application profile data describing characteristics of the subunits, and a knowledgebase defining the features and constraints associated with each of any number of candidate software application architectures.

20 Claims, 8 Drawing Sheets

OPTIMAL SOFTWARE ARCHITECTURE RECOMMENDATIONS BY AN APPLICATION MODERNIZATION SERVICE

BACKGROUND

Modernizing software applications is a common task for business organizations and other entities desiring to improve their information technology (IT) environments in response to changing software application use cases, resource demands, and user access patterns. For example, while many legacy applications were designed for older operating environments with lesser expectations, modern applications now often need the ability to scale quickly to potentially millions of users, have global availability, manage very large amounts of data, and respond to requests in milliseconds. The processes for upgrading, converting, rewriting, etc., such applications to enable improved performance is referred to generally as software modernization. Software application and software-based system modernization can include, for example, porting legacy applications or systems to modern computer programming languages or application frameworks, updating software libraries, protocols, or hardware platforms, and the like. For organizations desiring to make use of cloud provider network resources, the modernization process can further include migrating resources from an organization's on-premises environment to a cloud provider network, modernizing an application's architecture with containers, serverless functions, and other more scalable architecture tools provided by cloud provider networks.

BRIEF DESCRIPTION OF DRAWINGS

Various embodiments in accordance with the present disclosure will be described with reference to the drawings, in which.

DETAILED DESCRIPTION

Figure 1:
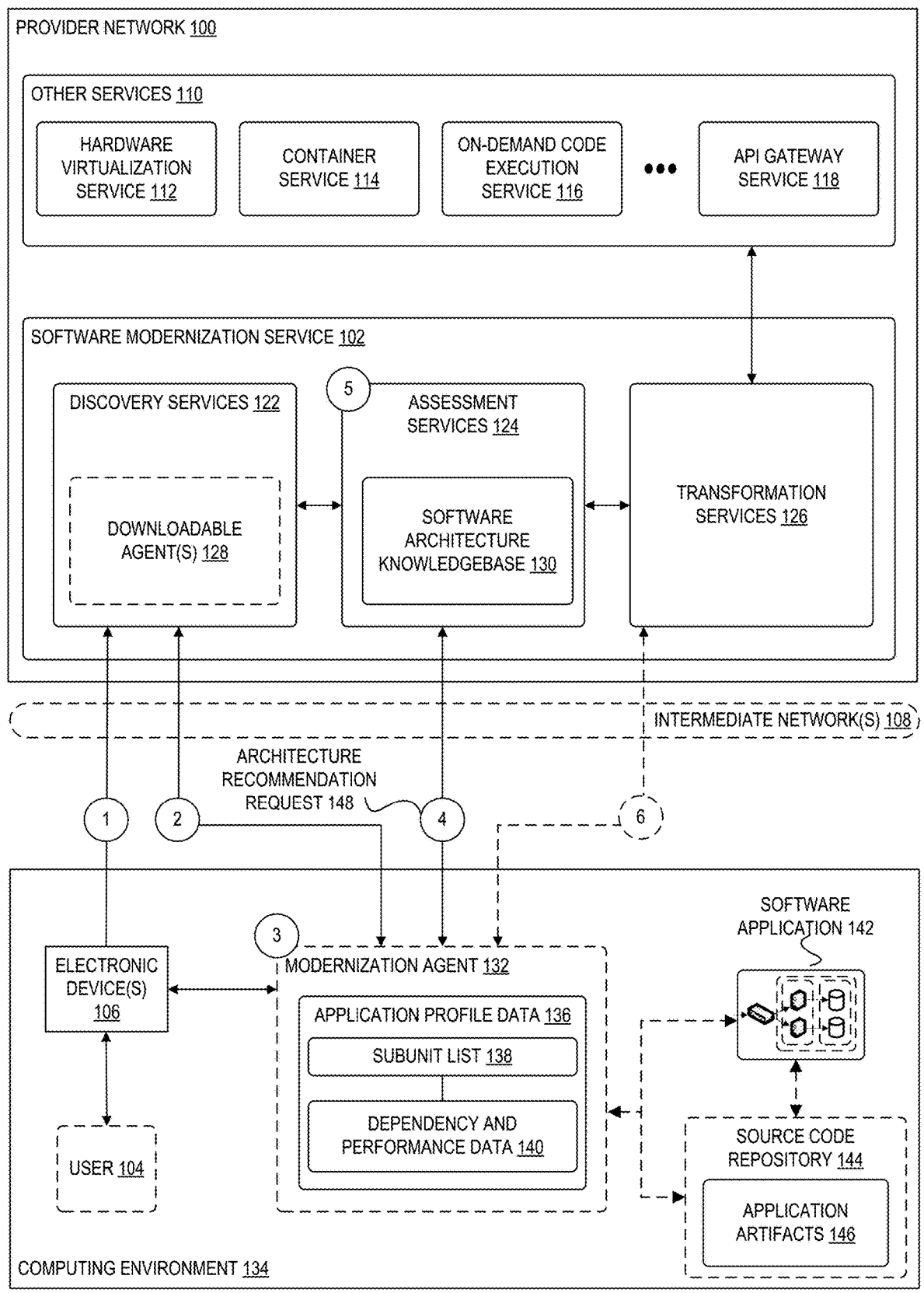
FIG. 1 is a diagram illustrating an environment that enables a software modernization service of a cloud provider network to provide software architecture recommendations based on application profile data describing a software application to be modernized according to some embodiments.

The present disclosure relates to methods, apparatus, systems, and non-transitory computer-readable storage media for enabling a software modernization system to identify a recommended modernized software architecture for a software application undergoing software modernization processes (e.g., as part of modernization processes aimed at migrating users' applications to a cloud service provider's infrastructure). According to some embodiments, an application modernization service of a cloud service provider and associated tools enable users desiring to modernize a software application (e.g., a monolithic legacy software application) to identify subunits of the application (sometimes also referred to herein as "microunits" or "subcomponents"). Each subunit represents a defined subset of a software application's source code that, with some amount of refactoring, can be implemented as an independently developed, buildable, and deployable software application unit. In some embodiments, the application modernization tools further enable the collection and generation of application profile data describing relationships among the identified subunits (e.g., package dependencies, calling relationships, etc.), static and dynamic performance information (e.g., central processing unit (CPU) usage, memory usage, execution time, etc.) related to the identified application subunits, anti-pattern information, among other collected information. According to embodiments described herein, an application modernization service provides an application programming interface (API) that enables users and applications to request the automatic identification of a recommended software architecture based on input identifying a software application's subunits, application profile data describing dependency and performance information related to the subunits, and a knowledgebase defining the features and constraints associated with each of any number of candidate software architectures.

Software modernization broadly refers to converting, rewriting, or porting legacy software applications or systems to more modern computer programming languages, software libraries, protocols, hardware platforms, application architectures, cloud-based services, and the like. Users, business organizations, and other entities often desire to modernize their various software applications and systems to improve operational performance, to increase application availability, to reduce exposure to vulnerabilities (e.g., software crashes, security vulnerabilities, etc.), to migrate applications from non-cloud environments to infrastructure provided by a cloud services provider (e.g., to leverage a cloud service's provider reliable infrastructure, increased performance benefits, etc.), and to enable more efficient ongoing development of the applications, among other possible reasons.

In some cases, modernizing a software application involves refactoring a monolithic software application into smaller subcomponents, where each subcomponent then includes an independent code base that can be independently maintained and deployed. The decomposition of a monolithic software application into such subcomponents can be associated with a host of benefits ranging from an improved ability to test and debug smaller units of code, an ability to independently scale various components of the application as needed, and so forth. However, a decomposed software application can be implemented using any of several different software architectures, design patterns, and execution environments, each with their own associated capabilities and limitations. As one example, it may be possible to implement a decomposed software application component using a "serverless" software architecture (e.g., using an on-demand code execution service of a cloud provider network), but only if the component's operation does not involve local filesystem access and only if the subcomponent can execute in under a threshold execution time. Other types of software architectures are associated with similarly nuanced feature sets and constraints. The complex nature of software applications and the intricacies of each of any number of different candidate software architectures often renders the process of selecting an optimal architecture for a given application an intractable problem for software developers desiring to efficiently modernize a software application.

The aforementioned challenges, among others, are addressed by an application modernization system that is capable of recommending candidate software application architectures based on an identified set of application subunits, application profile data describing characteristics of each of the subunits, and a knowledgebase defining various software architectures' capabilities and constraints. In some embodiments, the application modernization service provides an API that enables users and applications to request such recommendations and to be provided with information presenting the recommendations, information about possible impediments to the use of particular software architectures, and other possible information. Among other benefits, the efficient identification of recommended software architectures for a given software application enables the development of more robust and resilient software applications, an improved ability to modernize and migrate software applications to cloud-based execution environments, and the efficient use of computing resources supporting execution of such applications.

FIG. 1 is a diagram illustrating an environment that enables a software modernization service 102 of a cloud provider network 100 to provide software architecture recommendations based on application profile data describing a software application to be modernized (e.g., as part of modernization processes aimed at migrating users' applications to a cloud service provider's infrastructure). A provider network 100 (or "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") (e.g., a user 104) of provider networks 100 may utilize one or more user accounts that are associated with a customer account, though these terms may be used somewhat interchangeably depending upon the context of use. Users may interact with a provider network 100 via an electronic device (e.g., electronic device(s) 106) across one or more intermediate networks 108 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) may be part of, or serve as a front-end to, a control plane of the provider network 100 that includes "backend" services supporting and enabling the services that may be more directly offered to customers.

For example, a cloud provider network 100 typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as an availability domain, or simply a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Customers can connect to AZ of the cloud provider network via a publicly accessible network (e.g., the Internet, a cellular communication network), e.g., by way of a transit center (TC). TCs are the primary backbone locations linking customers to the cloud provider network and may be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence (or "POPs") outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 100 often rely upon virtualization techniques. For example, virtualization technologies may be used to provide users the ability to control or utilize compute resources (e.g., a "compute instance" such as a VM using a guest operating system (O/S) that operates using a hypervisor that may or may not further operate on top of an underlying host O/S, a container that may or may not operate in a VM, a compute instance that can execute on "bare metal" hardware without an underlying hypervisor), where one or multiple compute resources can be implemented using a single electronic device. Thus, a user may directly utilize a compute resource (e.g., provided by a hardware virtualization service) hosted by the provider network to perform a variety of computing tasks. Additionally, or alternatively, a user may indirectly utilize a compute resource by submitting code to be executed by the provider network (e.g., via an on-demand code execution service), which in turn utilizes one or more compute resources to execute the code—typically without the user having any control of or knowledge of the underlying compute instance (s) involved.

In FIG. 1, the cloud provider network 100 includes other services 110 in addition to the software modernization service 102. For example, a hardware virtualization service 112 (referred to in various implementations as an elastic compute service, a virtual machines service, a computing cloud service, a compute engine, or a cloud compute service) enables users of the provider network 100 to provision and manage compute resources such as virtual machine instances. Virtual machine technology can use one physical server to run the equivalent of many servers (each of which is called a virtual machine), for example using a hypervisor, which may run at least on an offload card of the server (e.g., a card connected via PCI or PCIe to the physical CPUs and other components of the virtualization host may be used for some virtualization management components. Such an offload card of the host can include one or more CPUs that are not available to customer instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

The container service 114 is a container orchestration and management service (referred to in various implementations as a container service, cloud container service, container engine, or container cloud service) that allows users of the cloud provider network to instantiate and manage containers. In some embodiments the container service 114 may be a Kubernetes-based container orchestration and management service (referred to in various implementations as a container service for Kubernetes, Azure Kubernetes service, IBM cloud Kubernetes service, Kubernetes engine, or container engine for Kubernetes). A container, as referred to herein, packages up code and all its dependencies so an application (also referred to as a task, pod, or cluster in various container platforms) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). While multiple virtual machines can run on one physical machine, each virtual machine typically has its own copy of an operating system, as well as the applications and their related files, libraries, and dependencies. Some containers can be run on instances that are running a container agent, and some containers can be run on bare-metal servers, or on an offload card of a server.

The on-demand code execution service 116 (referred to in various embodiments as a function compute service, functions service, cloud functions service, functions as a service, or serverless computing service) enables customers of the provider network 100 to execute their code on cloud resources without having to select or manage the underlying hardware resources used to execute the code. For example, a customer may be able to user the on-demand code execution service 116 by uploading their code and using one or more APIs to request that the service 116 identify, provision, and manage any resources required to run the code. A serverless function may be associated with a Uniform Resource Locator (URL), Uniform Resource Identifier (URI), or other reference, which may be used to invoke the serverless function. A serverless function may be executed by a compute resource, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time. In some embodiments, an API gateway service 118 is a managed service that enables users to create, publish, maintain, monitor, and secure APIs at any scale.

In some embodiments, a software modernization service 102 provides various types of software modernization services and functionality including discovery services 122, assessment services 124, and transformation services 126, collectively aimed at helping users discover and use recommended transformation and migration paths for their software applications. The discovery services 122, for example, include various tools used to generate an inventory of software applications in a computing environment 134 and to collect profile information for software applications undergoing modernization processes, which can be performed at least in part by various downloadable agents 128. The assessment services 124 enable users and applications to obtain various types of application modernization assessments and recommendations, e.g., based on profile data collected by the discovery services 122. For example, the recommendations provided by an assessment service 124 can include recommended modernization strategies, modernization tools, estimated modernization costs, etc. According to embodiments described herein, the recommendations provided by an assessment service 124 can include one or more recommended software architectures for a software application associated with an identified collection of subcomponents or subunits, where such recommendations can be generated based at least in part on a software architecture knowledgebase 130. The transformation services 124 provide various types of modernization tools to assist with active modernization processes, e.g., to assist users with containerizing an application, refactoring an application based on generated recommendations, deploying a modernized application using one or more other services 110 of the cloud provider network, and the like.

In some embodiments, users can obtain a downloadable agent 128 (e.g., by downloading the agent via a web-based console or other interface) and install the agent within a user's computing environment 134 to assist with various modernization-related processes. For example, in some embodiments, a modernization agent 132 is configured to collect and generate application profile data 136, including a subunit list 138 and associated dependency and performance data 140, based on application artifacts 146 (e.g., source code or other types of application artifacts such as bytecode, Common Intermediate Language (CIL) code, etc., used to implement a software application 142 and possibly stored in a source code repository 144) and monitoring the execution of the software application 142. As described in more detail hereinafter, once the subunit list 138 and associated dependency and performance data 140 is obtained, in some embodiments, the assessment services 124 can be used to identify a recommended software architecture for implementing the decomposed software application (e.g., based on an architecture recommendation request 148 associated with a defined API of the assessment services 124).

In some embodiments, at circle "1" in FIG. 1, a user accesses the software modernization service 102 to obtain information about various available modernization services and to download one or more modernization agents 132. In some embodiments, at circle "2," a modernization agent 132 is installed on servers within a user's on-premises computing environment 134 (e.g., on a physical server or VM). In some embodiments, users (e.g., a user 104) can use a computing device 106 to interact with a modernization agent 132 via a command line interface (CLI), graphical user interface (GUI), or other type of interface. As indicated above, a user 104 might desire to use a modernization agent 132 to assess a software application 142 for modernization recommendations suitable for the application, where the generation of such recommendations can include the identification of recommended software architectures for implementing a decomposed version of the software application. Although referred to herein as an "agent," in general, a modernization agent 132 can include a software agent, a standalone application, a server, or any other type of software application, and may be accessed using any of a GUI, CLI, web-based API, or any other type of interface. In some embodiments, instead of using a modernization agent 132, users can instead obtain application profile data 136 using other software tools or processes and upload the data using an API provided by the modernization service 102.

As part of the assessment process, in some embodiments, a user invokes an "inventory" command provided by a modernization agent 132 and used to identify applications located within the user's computing environment 134 (e.g., including software application 142 in the example of FIG. 1). In some embodiments, instead of interacting directly with a modernization agent 132, the user 104 instead interacts with a web-based console or other interface provided by the software modernization service 102. The software modernization service 102 may then in turn instruct a modernization agent 132 or other software agents running in the user computing environment 134 to perform some or all of the operations described in reference to FIG. 1 such as, for example, identifying an inventory of applications, obtaining application profile data 136 for one or more selected applications, and performing various application modernization analyses. In some embodiments, the software modernization service 102 may be a part of a migration service of a cloud provider network 100, which assists users with various types of application migration processes.

In some embodiments, once an application of interest is identified based on the inventory process described above or otherwise identified, the user can then execute an "analyze" command on the identified application 142. In some embodiments, responsive to an analyze command, at circle "3," a modernization agent 132 analyzes the identified software application 142 and generates application profile data 136 containing analysis results (e.g., based on a static analysis of source code associated with the application, a dynamic analysis of the application's execution, among other possible types of analyses). The analysis results may include various application attributes such as, for example, an operating system type associated with the application, an operating system version, process identifier, application type, a programming language used to develop the application, a location at which source code for the application is stored (e.g., a source code repository location), application server type and version, database type and version, integrations with other systems, configuration information, architecture type (e.g., monolithic, 3-tier, microservice-based, etc.), application scale (e.g., number of servers, data storage size, source code size), application importance, identified anti-patterns and cloud anti-patterns associated with the application, application dependencies (e.g., on third party software and libraries, other libraries and files, execution environments), application relationships (e.g., network connections, inter-process communications (IPC), remote procedure calls (RPC)), data flow and network throughput, and the like.

In some embodiments, the application profile data 136 includes a subunit list 138, identifying a plurality of identified subunits of the application, and dependency and performance data 140 related to the identified subunits. In some embodiments, the dependency and performance data 140 generally represents data describing dependency relations among packages, classes, methods, etc., as well as information about CPU usage, memory usage, etc., for each of the identified subunits. This application profile data 136 can be used by a modernization agent 132 and software modernization service 102, for example, to identify modernization recommendations and, in the context of software architecture recommendations, to identify a recommended software architecture pattern for the analyzed application. In FIG. 1, the numbered circles labeled "3"-"6" illustrate an example process that includes a modernization agent 132 obtaining application profile data 136, a modernization agent 132 sending an architecture recommendation request 148, an assessment service 124 generating a software architecture recommendation, and a user optionally performing one or more additional transformation processes based on the recommendation.

Figure 2:
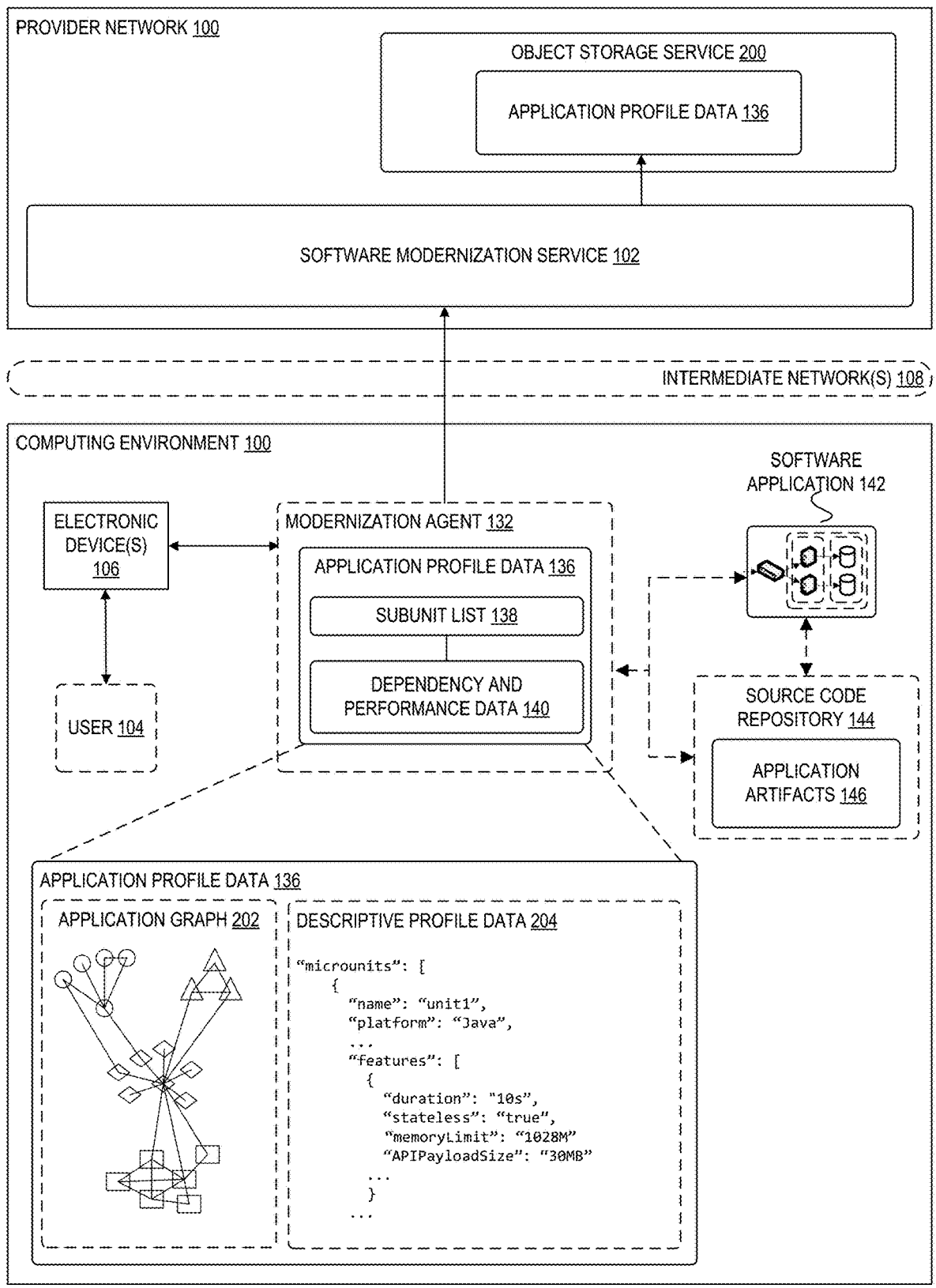
FIG. 2 is a diagram illustrating the use of a modernization agent installed in a user's computing environment to collect and generate application profile data identifying the subunits of a software application and associated application characteristics according to some embodiments.

FIG. 2 is a diagram illustrating the use of a modernization service agent to collect and generate application profile data identifying the subunits of a software application and associated dependency and performance data according to some embodiments. As shown in FIG. 2, in some embodiments, a modernization agent 132 collects and generates application profile data 136 for a software application including some or all of: an application graph 202 and descriptive profile data 204. An application graph 202, for example, can include a visual representation of an application's components and associated dependencies. For example, if a class contained in the source code of an application imports a particular software package, the graph may include an edge between respective nodes representing the package and class; if a method in the source code calls another method, the graph may include an edge between respective nodes representing the methods; and so forth. An application graph 202 thereby enables a user to readily understand and visualize the constituent parts of an application and to help identify sensible subunits. In other embodiments, other static and dynamic application analysis techniques are used to identify an application's subunits.

In some embodiments, the descriptive profile data 204 includes a textual representation of an application's subunits and associated dependency and performance data. For example, the descriptive profile data 204 can include, for each identified subunit of an application, information describing some or all of: a name of the subunit, a description of the subunit, a size of the subunit, types of interfaces associated with the subunit (e.g., input and output), dependencies associated with the subunit (e.g., to other subunits, to packages, etc.), an operating platform associated with the subunit (e.g., an OS and version, system architecture, programming language, framework(s) and versions, memory, etc.), features associated with the subunit such as, for example, an average or maximum execution time, a latency requirement, whether the subunit is stateful or stateless (e.g., based on memory, local file, or database usage), performance requirements (e.g., shared resources), environment variables, API payload size, burst workload, disk usage, memory usage, CPU usage, IPv4 or IPv6, IPC, RPC usage, etc. In some embodiments, the descriptive profile data 204 can be stored in a file, database, or other data structure generated by a modernization agent 132.

In some embodiments, either automatically by the modernization agent 132 or with input from a user, the agent 132 sends the application profile data 136 to the software modernization service 102 via a secure communication channel. In some embodiments, the software modernization service 102 stores the obtained data in a storage location associated with the user, e.g., in a storage bucket of an object storage service 200 or in any other storage resource. In some embodiments, the software modernization service 102 stores the application profile data 136 in a storage resource using a service-linked account configured by the user.

Returning to FIG. 1, once the subunits of an application 142 are identified and the associated dependency and performance data 140 is generated, in some embodiments, at circle "4," a modernization agent 132 generates and sends an architecture recommendation request 148 to the software modernization service 102 requesting a recommendation of an optimal software architecture for the application (or for one or more subunits thereof). The request 148, for example, may be sent automatically responsive to the modernization agent 132 collecting the application profile data 136, in response to user input to the modernization agent 132 or software modernization service 102 requesting the recommendation (e.g., using a "GetOptimalArchitecture" API, where the API includes input parameters specifying the subunits dependency and performance data). In some embodiments, the request 148 includes parameters specifying the identified subunits and the dependency and performance data, e.g., using a descriptive representation of both (e.g., using JSON-formatted data or using any other data format). In other embodiments, the request includes an identifier of an application 142 to be analyzed and the software modernization service 102 obtains the data describing the application from an associated storage location at the cloud provider network 100. In some embodiments, the request includes other parameters such as a desired set of software architectures to analyze, one or more software architectures to omit from the analysis, or other information about the application 142 that may be useful in the recommendation analysis.

In some embodiments, at circle "5," an assessment service 124 uses a software architecture knowledgebase 130 to determine, based on the identified subunits and dependency and performance data, a recommended software architecture from a set of candidate software architectures (e.g., candidate software architectures possibly including a service-oriented application (SOA) architecture, a microservices architecture, a serverless architecture, etc.). In some embodiments, a software modernization ontology model is defined and used to describe each of the three software architectures (possibly in addition to any number of other software modernization concepts), although generally other types of data structures and models can be used such as decision trees, text-based models, database models, machine learning (ML) based models etc. In general, the software architecture knowledgebase 130 includes data indicating relevant features and constraints associated with each of the candidate software architectures under consideration.

Figure 3:
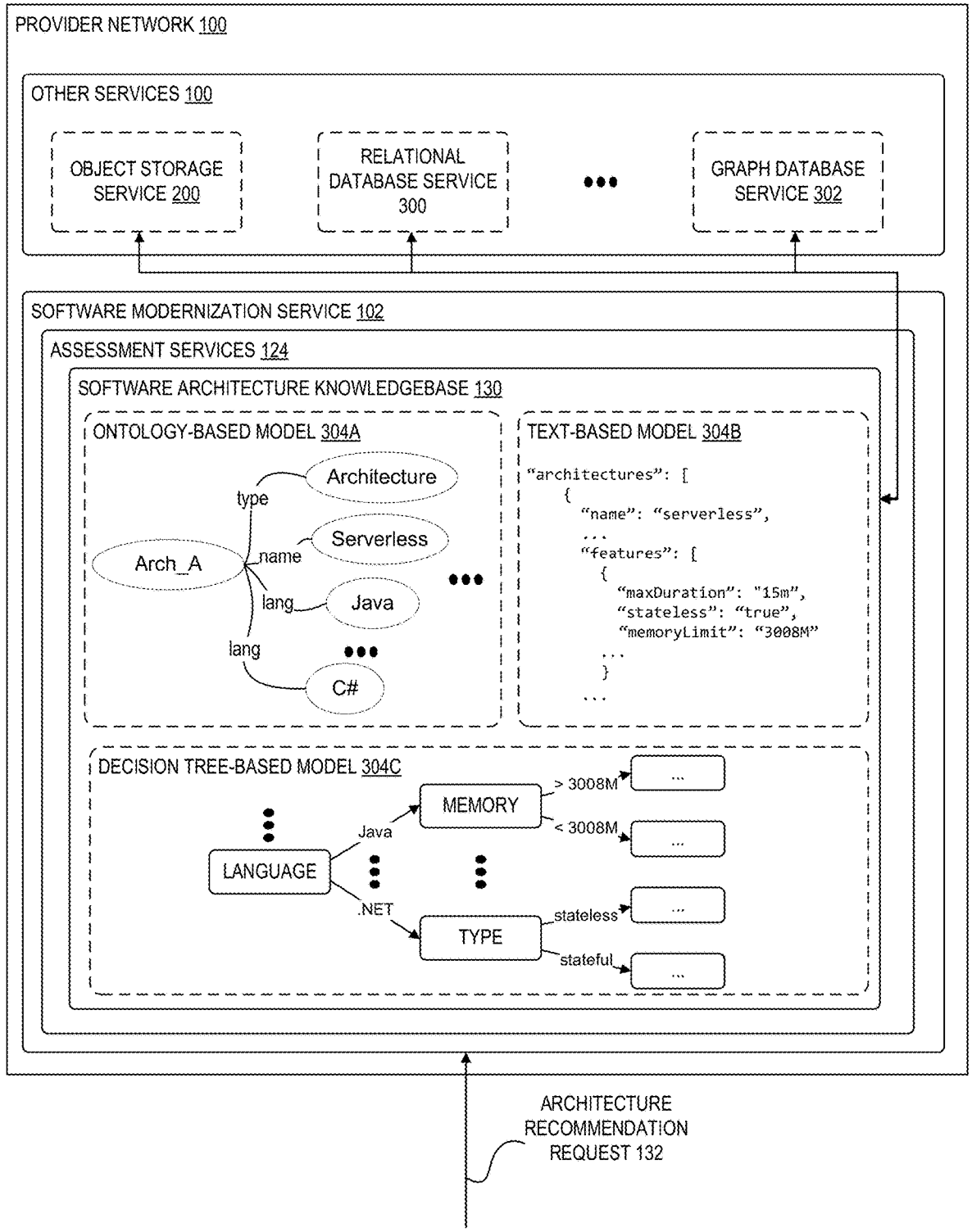
FIG. 3 is a diagram illustrating the use of a software architecture information knowledgebase to identify suitable modernized software architectures for a software application according to some embodiments.

FIG. 3 is a diagram illustrating the use of a software architecture information knowledgebase to identify suitable modernized software architectures for a software application according to some embodiments. In some embodiments, the knowledgebase 130 includes one or more data models describing the features and constraints of various software architectures. For example, the data models can include one or more ontology models 304A, where an ontology model enables the software modernization domain and its associated resources become semantic, or self-explanatory, to a modernization assessment engine of an assessment service 124 and possibly other tools. The ability to use such ontologies increases integration, querying, and interoperability of the software modernization service 102. For example, the modernization knowledgebase 130 is flexibly defined, where modifications to modernization models stored in the knowledge base including adding, removing, or modifying a data model rather than static relationships and restrictions between the resources are hard coded into an application. In some embodiments, a software architecture knowledgebase 130 includes one or more text-based models 304B (e.g., text-based descriptions of the features and constraints associated with various types of software architectures), decision tree-based models 304C, or any other type of data models. A decision tree-based model, for example, includes nodes and edges that form a flowchart-like structure, where the paths from a root node to leaf nodes represent a set of classification rules for the plurality of software application architectures. In this example, a decision tree-based model can be queried to test attributes of the software application being analyzed against various conditions defined by the model and representing the features and constraints of the software application architectures to identify one or more recommended architectures.

As indicated above, in some embodiments, a software architecture knowledgebase 130 is a repository of information about the software modernization domain, where the information is defined using a modernization ontology and associated modernization data models (e.g., instances of the modernization ontology used to describe particular modernization strategy, tools, or other information). In some embodiments, a modernization ontology is a single interconnected ontology, or may be a collection of related ontologies that may not be directly connected to one another. In some embodiments, the modernization ontology is specified at least in part using the Resource Description Framework (RDF), RDF Schema (RDFS), Web Ontology Language (OWL), or any other type of metadata data model. These metadata data models generally can be used to conceptually describe and model the modernization information including, for example, modernization tools, tool features and constraints, development pattern and anti-pattern information (including various types of cloud anti-patterns), software architectures, and so forth.

In some embodiments, a software architecture knowledgebase 130 is stored in a database or other data repository, where the data repository may be managed by the software modernization service 102 directly or by another service of a cloud provider network 100. For example, depending on the format of the models, the models may be stored in any of an object storage service 200, a relational database service 300, graph database service 302, or any other type of storage resource accessible to the assessment services 124.

In some embodiments, a user uses an ontology editor or other type of application running on an electronic device to define an ontology or other data model representing various types of software architectures. An ontology editor, for example, can be a web browser, text editor, integrated development environment (IDE), or any other type of executable application. In some embodiments, the development of an ontology is aided by an ontology API, which enables interactions with an ontology such including creating a new metadata model, adding "semantic triples" to a model, querying a model, and so forth.

As shown in FIG. 3, in some examples, an ontology can be represented by a directed graph consisting of nodes and edges. In some embodiments, the graph is derived from a defined collection of semantic triples, where a semantic triple consists of a set of three entities that codify a statement about semantic data in the form of a subject-predicate-object expression (e.g., Serverless Software Architecture (the subject) supports the programming language (the predicate) Java (object expression)). In some embodiments, a user defines a modernization ontology using a text-based representation of such semantic triples, using a visual-based editor to create a directed graph representation of the triples, or using any other application that enables the definition of ontology information. As indicated above, in some embodiments, the data representing the nodes (e.g., corresponding to a resource or literal) and edges (e.g., relationships between the resources or literals) of a modernization ontology is stored in a data store, for example, in the form a database, text file, or other data format.

In some embodiments, the determination of whether a particular software architecture is suitable for a given application is based at least in part on querying a data model describing the software architecture with values from the dependency and performance data 140 for each subunit of the application. For example, if the application profile data 136 indicates that a subunit of an application 142 is implemented using the C # programming language, the assessment service 124 may query the software architecture data models to identify (or to rule out) software architectures that support the use of the identified language. Similarly, the assessment service 124 may query the data models to determine whether the amount of memory used by a subunit is suitable for one or more architectures, whether the stateful or stateless nature of a subunit is supported by one or more architectures, whether a subunit's use of a local filesystem, database, in-memory calls, share-memory interface calls, failure handling, or any other characteristics of a subunit defined in the application profile data 136 are suitable for a given software architecture based on the features and constraints defined for each architecture in the data models.

In some embodiments, the software architecture knowledgebase 130 includes a priority ordering of some or all of the candidate software architectures. For example, the priority ordering may specify that a serverless software architecture is preferable to a microservices-based architecture and a SOA architecture, while the microservices-based architecture is preferable to a SOA architecture. In general, a priority ordering of the software architectures may be defined by an operator of the assessment services 124 or a user of the services. In some embodiments, the priority ordering may be used to control an order in which analyses are performed, e.g., the assessment service 124 may first determine whether a preferred serverless architecture is suitable for a subunit, and then only determine whether a microservices-based architecture is suitable if the serverless architecture is not suitable, and so forth. In some embodiments, the assessment service 124 may evaluate the suitability of all architectures and present to the user recommended software architectures in an order based on the defined priority ordering.

In some embodiments, a recommended software architecture may be determined for the software application 142 as a whole or for one or more subunits individually. For example, the assessment service 124 may recommend only a single software architecture that is suitable for all of the identified subunits of the application 142. In other embodiments, the assessment service 124 determines a recommended software architecture for one or more individual subunits and returns information indicating a hybrid mix of recommended software architectures for the application 142 (e.g., to recommend a serverless software architecture for one or more of the subunits and a service-oriented application architecture for one or more of the other subunits).

In some embodiments, the assessment service 124 further identifies, based on an identified software architecture for a software application 142, one or more modernization tools that can be used to refactor or otherwise convert the application 142 into form suitable for the recommended software architecture. For example, if the assessment service 124 recommends a microservices-based architecture, the data models defined by the software modernization service 102 may further specify one or more available modernization tools that can be used to convert the software application 142 into a containerized form that is suitable for a microservices-based architecture. In some embodiments, at circle "6," the modernization agent 132 can request the use of such identified modernization tools from the transformation services 126.

In some embodiments, once a recommended software architecture is identified for the application, the assessment service 124 causes display of a graphical user interface (GUI) including an indication of the recommended software application architecture. For example, the assessment services 124 may provide a web-based console or other interface that displays the recommendation information and other possible information (e.g., an indication of any related tools that can be used to convert the application into a form suitable for the recommended architecture). In some embodiments, the GUI generated by the assessment service 124 includes a diagram or other graphical representation of resources provided by the cloud provider network to be used to implement the software application based on the recommended software architecture. For example, if the assessment service 124 determines that a microservices-based architecture is recommended for a software application 142, the assessment service 124 can generate an interface that displays a set of one or more provider network 100 services and resources that can be used to implement the software application 142 using the recommended architecture (e.g., a representation of an on-demand code execution service and associated on-demand code resources), and may further display a mapping between one or more identified subunits and particular resources. In other examples, representations of containers, a container service of the cloud provider network, and mappings to particular subunits of an analyzed application may be displayed for other applications. In some embodiments, the display can further include indications of one or more modernization tools that can be used to migrate identified subunits of the software application 142 to the identified resources. In this manner, a user can obtain a better understanding of an actual implementation of the recommended architecture using resources of the provider network 100 or other environments.

In some embodiments, the assessment services 124 may determine, based on the application profile data 136, that a particular software architecture is unsuitable for the software application based on a characteristic of the software application in the application profile data. For example, as indicated above, the application profile data 136 may indicate that the subunits of the software application 142 are implemented in a programming language that is unsuitable for one or more architectures, involve the use of local filesystem access or inter process communications that render the application unsuitable for one or more architectures. In some embodiments, the assessment service 124 causes display of information that indicates one or more impediments to the use of a particular software architecture. Such information, for example, may be used to identify to a user one or more refactoring efforts that could be implemented to put the application in condition for using a particular software architecture.

Figure 4:
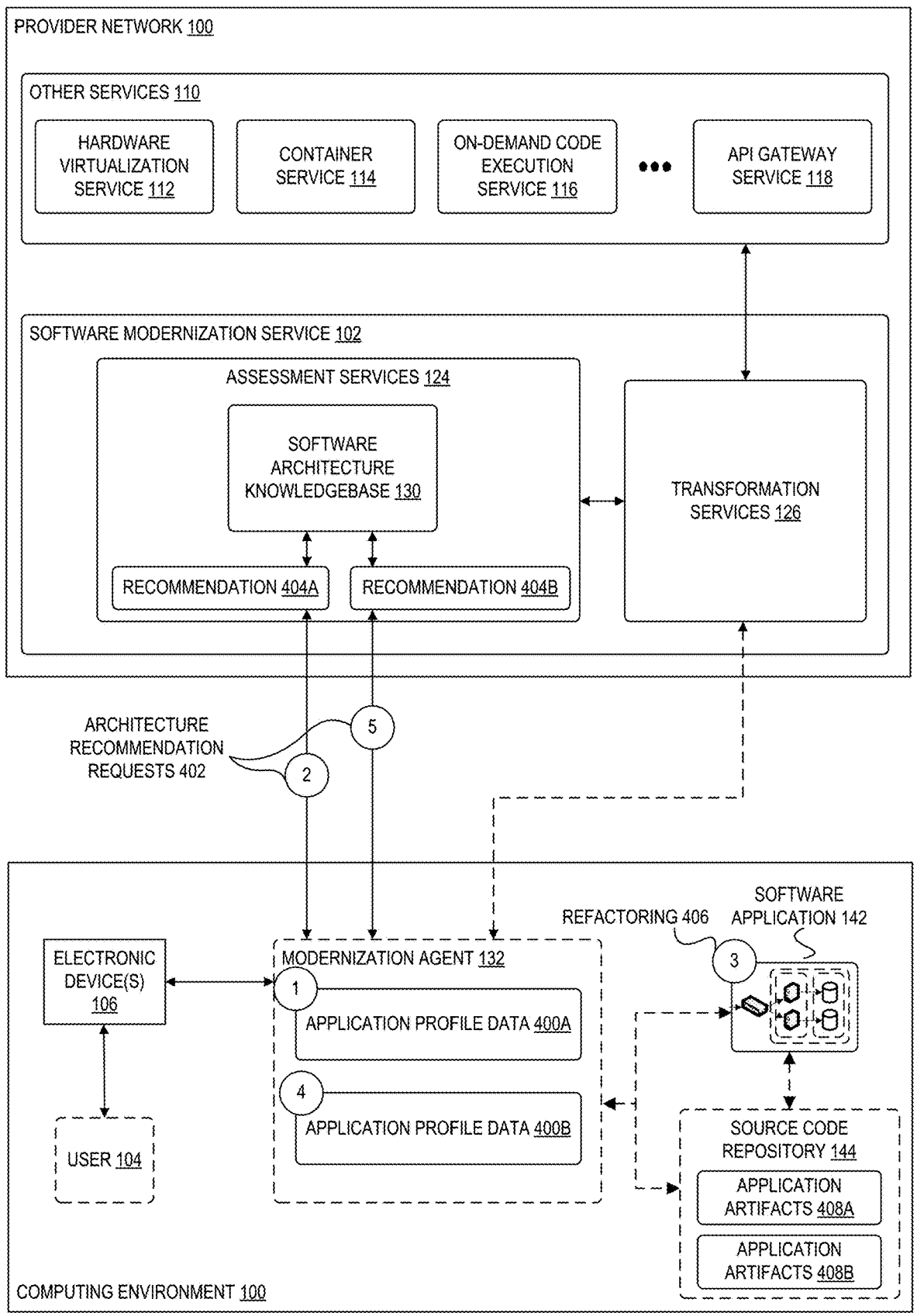
FIG. 4 illustrates an iterative software architecture recommendation process based on refactoring a software application undergoing modernization processes.

FIG. 4 illustrates an iterative process of providing software architecture recommendations, a user refactoring an application based on a recommendation, and obtaining a subsequent a recommendation based on the refactored application. For example, at circle "1," a modernization agent 132 may initially generate application profile data 400A for a software application 142 based on an initial set of application artifacts 408A. In this example, at circle "2," the modernization agent 132 generates a first architecture recommendation request 402 requesting identification of a recommended software architecture for the application 142 and the assessment services 124 generate an initial recommendation 404A. The recommendation 404A may identify a suitable architecture based on querying the knowledgebase 130 based on values from the application profile data 400A and identify at least one suitable architecture and at least one unsuitable software architecture (e.g., based on the current version of the software application 142 including one or more characteristics that serve as impediments to the use of the software application).

In this example, a user associated with the software application 142 may desire to utilize the presently unsuitable software architecture (e.g., because of performance, scalability, or other characteristics of the architecture) and, at circle "3," refactor 406 the application 142 based on the information provided to the user by the assessment services 124 identifying the impediments to the use of the software architecture resulting in refactored application artifacts 408B. In some embodiments, at circle "4," the user may then cause a modernization agent 132 to reanalyze the application based on the refactored application artifacts 408B, resulting in updated application profile data 400B. In some embodiments, at circle "5," the modernization agent 132 then causes the generation of a new architecture recommendation request 402. In some embodiments, based on the updated application profile data 400B, the assessment service 124 generates a new recommendation 404B, where the new recommendation may instead recommend the previously unsuitable software architecture assuming the identified impediments have been resolved in the updated version of the software application 142.

Figure 5:
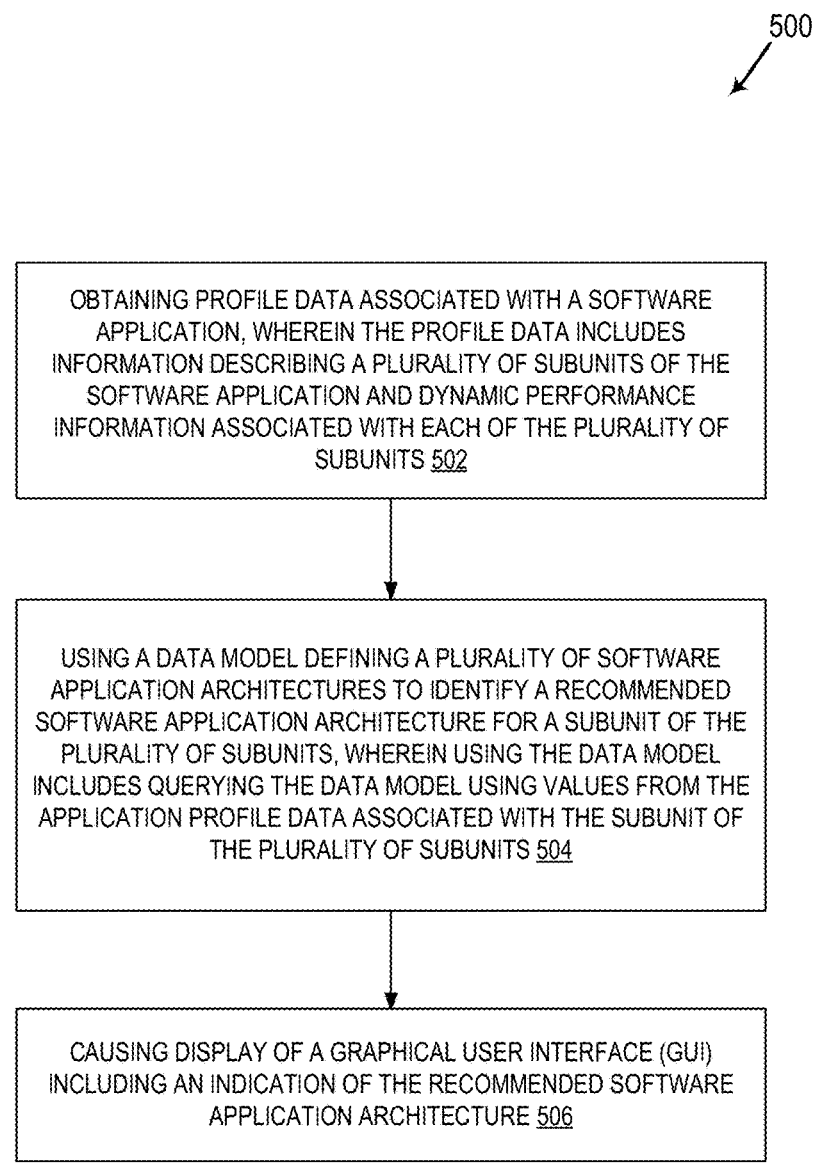
FIG. 5 is a flow diagram illustrating operations of a method for enabling a software modernization service to identify recommended modernized software architectures for software applications undergoing software modernization processes according to some embodiments.

FIG. 5 is a flow diagram illustrating operations of a method 500 for enabling a software modernization service to identify recommended modernized software architectures for software applications undergoing software modernization processes according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by a software modernization service 102, modernization agent 132, or other component of the other figures.

The operations 500 include, at block 502, obtaining profile data associated with a software application, wherein the profile data includes information describing a plurality of subunits of the software application and dynamic performance information associated with each of the plurality of subunits.

The operations 500 further include, at block 504, using a data model defining a plurality of software application architectures to identify a recommended software application architecture for a subunit of the plurality of identified subunits, wherein using the data model includes querying the data model using values from the application profile data associated with the subunit of the plurality of identified subunits.

The operations 500 further include, at block 506, causing display of a graphical user interface (GUI) including an indication of the recommended software application architecture. In some embodiments, the interface further includes a representation of resources provided by the cloud provider network to be used to implement the software application based on the recommended software architecture.

In some embodiments, the recommended software application architecture is one of a plurality of software architectures defined in the data model, and wherein the plurality of software architectures are associated with a priority ordering, and wherein determining the recommended software architecture includes: querying the data model with values from the application profile data to identify a plurality of suitable software architectures; and applying the priority ordering to the suitable software architectures to identifying the recommended software architecture.

In some embodiments, the operations further include determining, based on the application profile data, that a particular software architecture is unsuitable for the software application based on a characteristic of the software application specified in the application profile data; and wherein the GUI includes an indication of the characteristic of the software application and a recommendation for refactoring the software application to be suitable for the particular software architecture.

In some embodiments, the recommended software application architecture is one of the plurality of software application architectures, and wherein the plurality of software application architectures includes at least one of: a serverless architecture, a microservices architecture, or a service-oriented application (SOA) architecture.

In some embodiments, the data model is based on a software modernization ontology model defining a set of features and a set of constraints associated with each of the plurality of software application architectures, and wherein the software modernization ontology model is defined using at least one of: the Resource Description Framework (RDF), a RDF Schema (RDFS), or the Web Ontology Language (OWL).

In some embodiments, the profile data describing the subunit includes at least one of: a programming language used to implement the subunit, an indication of a dependency with another subunit of the plurality of subunits, an indication of dependency with a software package, an indication of a software framework dependency, an indication of whether the subunit's execution is stateless or stateful, an indication of whether the subunit's execution involves the use of a local filesystem, an indication of whether the subunit's execution involves the use of a database, or an indication of the subunit's maximum execution time.

In some embodiments, the operations further include: determining, based on the recommended software application architecture, a recommended modernization tool that can be used to modernize the software application to the recommended software application architecture; and causing display in the GUI an indication of the recommended modernization tool.

In some embodiments, the subunit is a first subunit and the recommended software application architecture is a first recommended software application architecture, and the operations further include: using the data model to identify a second recommended software application architecture for a second subunit of the plurality of subunits, wherein the second recommended software application architecture is different from the first recommended software application architecture; and wherein the GUI displays a first indication of the first recommended software application architecture for the first subunit and a second indication of the second recommended software application architecture for the second subunit.

In some embodiments, the subunit includes a defined subset of the code used to implement the software application, and wherein the method further comprises displaying a graphical representation of the subunit in the GUI.

In some embodiments, the profile data is generated by a modernization assessment agent installed in a user's computing environment containing an instance of the software application, and wherein generating the application profile data includes: analyzing source code associated with the software application and obtained from a source code repository, and monitoring execution of the software application to obtain dynamic performance information.

In some embodiments, the profile data is first profile data, wherein identifying the recommended software application architecture is based on a first application programming interface (API) request to identify a first recommended software application architecture, and the operations further include: receiving a second API request to identify a second recommended software application architecture based on second profile data reflecting a refactored version of the software application; using the data model to identify a second recommended software application architecture pattern for the subunit, wherein the second recommended software application architecture is different from the first recommended software application architecture; and causing display of a second GUI including an indication of the second recommended software application architecture.

Figure 6:
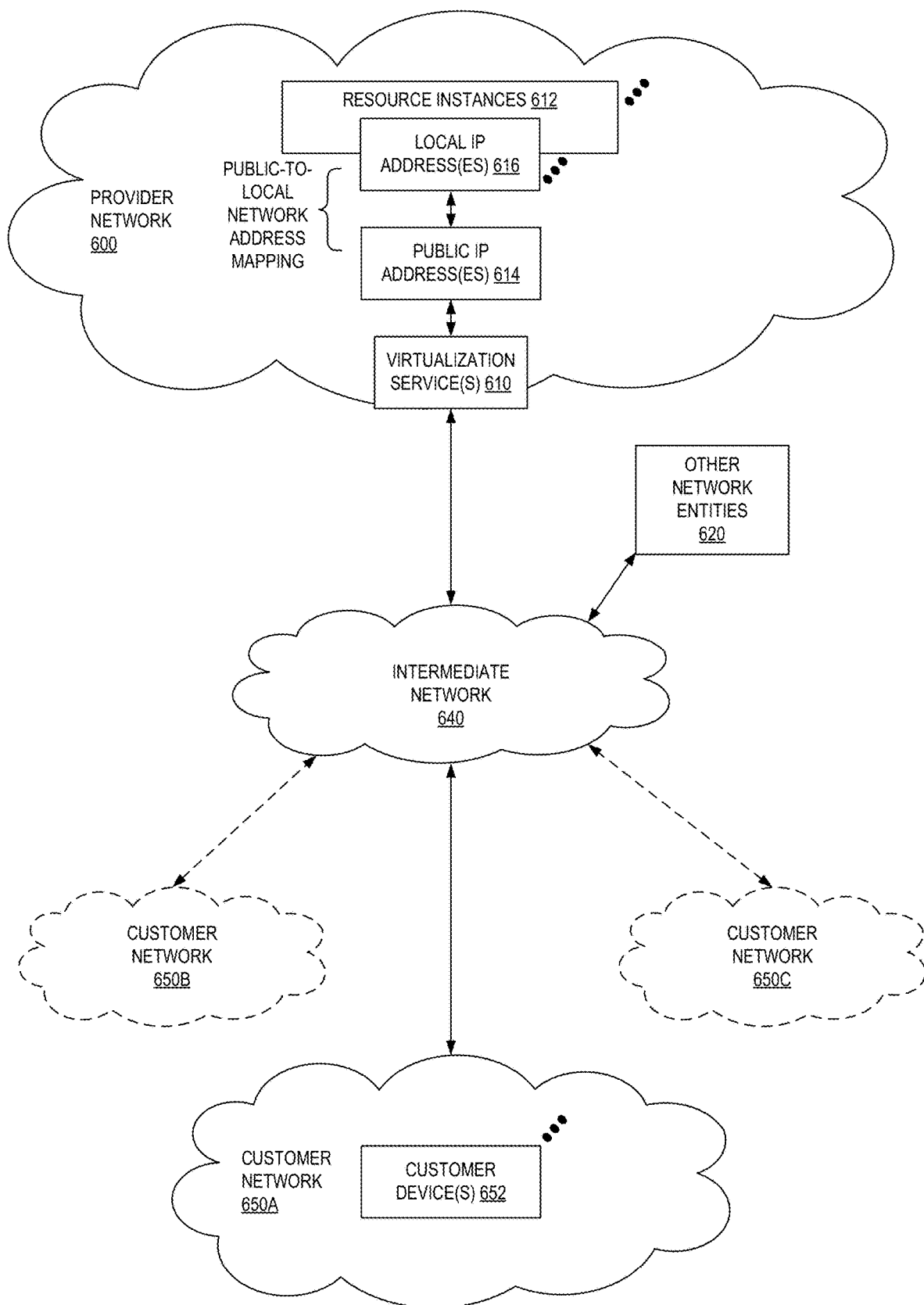
FIG. 6 illustrates an example provider network environment according to some embodiments.

FIG. 6 illustrates an example provider network (or "service provider system") environment according to some embodiments. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 may be associated with the resource instances 612; the local IP addresses are the internal network addresses of the resource instances 612 on the provider network 600. In some embodiments, the provider network 600 may also provide public IP addresses 614 and/or public IP address ranges (e.g., Internet Protocol version 4 (IPv4) or Internet Protocol version 6 (IPv6) addresses) that customers may obtain from the provider 600.

Conventionally, the provider network 600, via the virtualization services 610, may allow a customer of the service provider (e.g., a customer that operates one or more client networks 650A-650C including one or more customer device(s) 652) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 640, such as the Internet. Other network entities 620 on the intermediate network 640 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
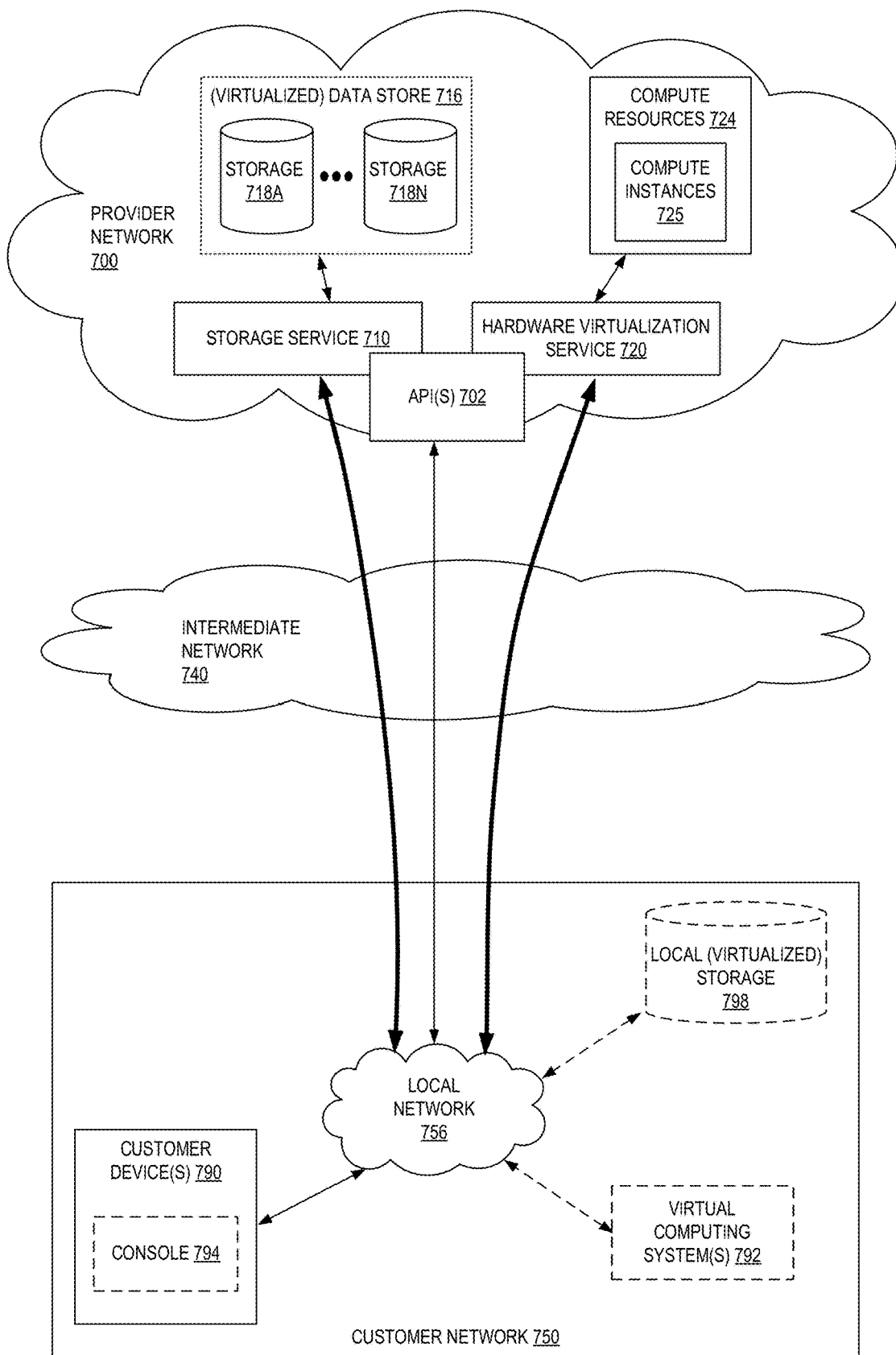
FIG. 7 is a block diagram of an example provider network that provides a storage service and a hardware virtualization service to customers according to some embodiments.

FIG. 7 is a block diagram of an example provider network that provides a storage service and a hardware virtualization service to customers, according to some embodiments. Hardware virtualization service 720 provides multiple compute resources 724 (e.g., compute instances 725 such as VMs) to customers. The compute resources 724 may, for example, be rented or leased to customers of the provider network 700 (e.g., to a customer that implements customer network 750). Each computation resource 724 may be provided with one or more local IP addresses. Provider network 700 may be configured to route packets from the local IP addresses of the compute resources 724 to public Internet destinations, and from public Internet sources to the local IP addresses of compute resources 724.

Provider network 700 may provide a customer network 750, for example coupled to intermediate network 740 via local network 756, the ability to implement virtual computing systems 792 via hardware virtualization service 720 coupled to intermediate network 740 and to provider network 700. In some embodiments, hardware virtualization service 720 may provide one or more APIs 702, for example a web services interface, via which a customer network 750 may access functionality provided by the hardware virtualization service 720, for example via a console 794 (e.g., a web-based application, standalone application, mobile application, etc.). In some embodiments, at the provider network 700, each virtual computing system 792 at customer network 750 may correspond to a computation resource 724 that is leased, rented, or otherwise provided to customer network 750.

From an instance of a virtual computing system 792 and/or another customer device 790 (e.g., via console 794), the customer may access the functionality of storage service 710, for example via one or more APIs 702, to access data from and store data to storage resources 718A-718N of a virtual data store 716 (e.g., a folder or "bucket", a virtualized volume, a database, etc.) provided by the provider network 700. In some embodiments, a virtualized data store gateway (not shown) may be provided at the customer network 750 that may locally cache at least some data, for example frequently-accessed or critical data, and that may communicate with storage service 710 via one or more communications channels to upload new or modified data from a local cache so that the primary store of data (virtualized data store 716) is maintained. In some embodiments, a user, via a virtual computing system 792 and/or on another customer device 790, may mount and access virtual data store 716 volumes via storage service 710 acting as a storage virtualization service, and these volumes may appear to the user as local (virtualized) storage 798.

While not shown in FIG. 7, the virtualization service(s) may also be accessed from resource instances within the provider network 700 via API(s) 702. For example, a customer, appliance service provider, or other entity may access a virtualization service from within a respective virtual network on the provider network 700 via an API 702 to request allocation of one or more resource instances within the virtual network or within another virtual network.

Figure 8:
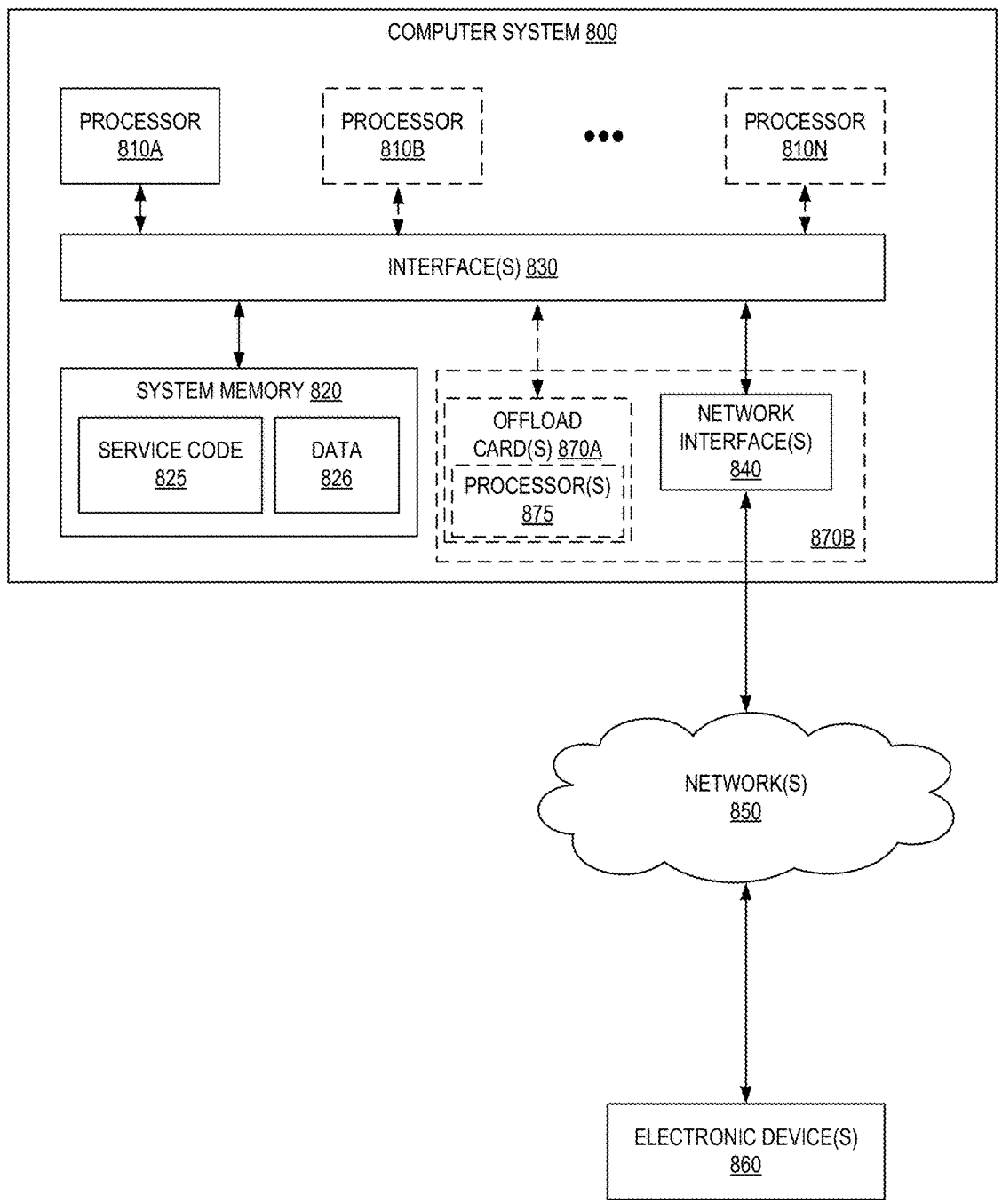
FIG. 8 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 800 illustrated in FIG. 8. In the illustrated embodiment, computer system 800 includes one or more processors 810 coupled to a system memory 820 via an input/output (I/O) interface 830. Computer system 800 further includes a network interface 840 coupled to I/O interface 830. While FIG. 8 shows computer system 800 as a single computing device, in various embodiments a computer system 800 may include one computing device or any number of computing devices configured to work together as a single computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 810 may commonly, but not necessarily, implement the same ISA.

System memory 820 may store instructions and data accessible by processor(s) 810. In various embodiments, system memory 820 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 820 as service code 825 (e.g., executable to implement, in whole or in part, the software modernization service 102 and associated components) and data 826.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850, such as other computer systems or devices as illustrated in FIG. 1, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 800 includes one or more offload cards 870A or 870B (including one or more processors 875, and possibly including the one or more network interfaces 840) that are connected using an I/O interface 830 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 800 may act as a host electronic device (e.g., operating as part of a hardware virtualization service) that hosts compute resources such as compute instances, and the one or more offload cards 870A or 870B execute a virtualization manager that can manage compute instances that execute on the host electronic device. As an example, in some embodiments the offload card(s) 870A or 870B can perform compute instance management operations such as pausing and/or un-pausing compute instances, launching and/or terminating compute instances, performing memory transfer/copying operations, etc. These management operations may, in some embodiments, be performed by the offload card(s) 870A or 870B in coordination with a hypervisor (e.g., upon a request from a hypervisor) that is executed by the other processors 810A-810N of the computer system 800. However, in some embodiments the virtualization manager implemented by the offload card(s) 870A or 870B can accommodate requests from other entities (e.g., from compute instances themselves), and may not coordinate with (or service) any separate hypervisor.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 718A-718N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   obtaining profile data associated with a software application, wherein the profile data includes information describing a plurality of subunits of the software application and dynamic performance information associated with each of the plurality of subunits, wherein the profile data describing a subunit includes at least one of: a programming language used to implement the subunit, an indication of a dependency with another subunit of the plurality of subunits, an indication of dependency with a software package, an indication of a software framework dependency, an indication of whether the subunit's execution is stateless or stateful, an indication of whether the subunit's execution involves the use of a local filesystem, an indication of whether the subunit's execution involves the use of a database, or an indication of the subunit's maximum execution time;
   using a data model defining a plurality of software application architectures to identify a recommended software application architecture for a subunit of the plurality of subunits, wherein using the data model includes querying the data model using values from the profile data associated with the subunit of the plurality of subunits; and
   causing display of a graphical user interface (GUI) including an indication of the recommended software application architecture.

2. The computer-implemented method of claim 1, wherein the recommended software application architecture is one of a plurality of software application architectures defined in the data model, and wherein the plurality of software application architectures is associated with a priority ordering, and wherein determining the recommended software application architecture includes:
   querying the data model with values from the profile data to identify a plurality of suitable software application architectures; and
   applying the priority ordering to the suitable software application architectures to identifying the recommended software application architecture.

3. The computer-implemented method of claim 1, further comprising:
   determining, based on the profile data, that a particular software application architecture is unsuitable for the software application based on a characteristic of the software application specified in the profile data; and
   wherein the GUI includes an indication of the characteristic of the software application and a recommendation for refactoring the software application to be suitable for the particular software application architecture.

4. The computer-implemented method of claim 1, wherein the recommended software application architecture is one of the plurality of software application architectures, and wherein the plurality of software application architectures includes at least one of: a serverless architecture, a microservices architecture, or a service-oriented application (SOA) architecture.

5. The computer-implemented method of claim 1, wherein the data model is based on at least one of:
   a decision tree including representing a set of classification rules for the plurality of software application architectures, or
   a software modernization ontology model defining a set of features and a set of constraints associated with each of the plurality of software application architectures, and wherein the software modernization ontology model is defined using at least one of: the Resource Description Framework (RDF), a RDF Schema (RDFS), or the Web Ontology Language (OWL).

6. The computer-implemented method of claim 1, wherein the subunit is a first subunit and the recommended software application architecture is a first recommended software application architecture, and wherein the method further comprises:
   using the data model to identify a second recommended software application architecture for a second subunit of the plurality of subunits, wherein the second recommended software application architecture is different from the first recommended software application architecture; and
   wherein the GUI displays a first indication of the first recommended software application architecture for the first subunit and a second indication of the second recommended software application architecture for the second subunit.

7. The computer-implemented method of claim 1, wherein the subunit includes a defined subset of the code used to implement the software application, and wherein the method further comprises displaying a graphical representation of the subunit in the GUI.

8. The computer-implemented method of claim 1, wherein the profile data is generated by a modernization assessment agent installed in a user's computing environment containing an instance of the software application, and wherein generating the application profile data includes:
   analyzing source code associated with the software application and obtained from a source code repository, and
   monitoring execution of the software application to obtain dynamic performance information.

9. The computer-implemented method of claim 1, wherein the profile data is first profile data, wherein identifying the recommended software application architecture is based on a first application programming interface (API) request to identify a first recommended software application architecture, and wherein the method further comprises:
   receiving a second API request to identify a second recommended software application architecture based on second profile data reflecting a refactored version of the software application;

using the data model to identify a second recommended software application architecture pattern for the subunit, wherein the second recommended software application architecture is different from the first recommended software application architecture; and causing display of a second GUI including an indication of the second recommended software application architecture.

10. The computer-implemented method of claim 1, wherein the GUI further includes a representation of resources provided by a cloud provider network to be used to implement the software application based on the recommended software application architecture.

11. A system comprising:
a first one or more electronic devices to implement a software modernization service in a cloud provider network, the software modernization service including instructions that upon execution cause the software modernization service to:
receive an application programming interface (API) request to identify a recommended software application architecture for a software application, wherein the request includes:
data identifying a plurality of subunits of the software application, wherein each subunit of the plurality of subunits represents a component of the software application can be implemented as an independently deployable component of the software application, and
application profile data including indications of dependencies among the plurality of subunits of the software application and dynamic performance information associated with each of the plurality of subunits,
determine, based on the data identifying the plurality of subunits of the software application and the application profile data, a recommended software application architecture for the software application, wherein the recommended software application architecture is identified based at least in part on querying a data model representing each of a plurality of candidate software application architectures using values from the application profile data, and
cause display of a graphical user interface (GUI) including an indication of the recommended software application architecture; and
a second one or more electronic devices to implement a software agent, the software agent including instructions that upon execution cause the software agent to:
analyze the software application, and
generate at least a first portion of the application profile data based on a static analysis of source code associated with the software application, and
generate at least a second portion of the application profile data based on a dynamic analysis of execution of the software application.

12. The system of claim 11, wherein the recommended software application architecture is one of a plurality of software application architectures defined in the data model, and wherein the plurality of software application architectures are associated with a priority ordering, and wherein determining the recommended software application architecture includes:
querying the data model with values from the application profile data to identify a plurality of suitable software application architectures; and
applying the priority ordering to the suitable software application architectures to identifying the recommended software application architecture.

13. The system of claim 11, wherein the software modernization service further includes instructions that upon execution cause the software modernization service to:
determining, based on the application profile data, that a particular software application architecture is unsuitable for the software application based on a characteristic of the software application specified in the application profile data; and
wherein the GUI includes an indication of the characteristic of the software application and a recommendation for refactoring the software application to be suitable for the particular software application architecture.

14. The system of claim 11, wherein the recommended software application architecture is one of the plurality of candidate software application architectures, and wherein the plurality of software application architectures includes at least one of: a serverless architecture, a microservices architecture, or a service-oriented application (SOA) architecture.

15. The system of claim 11, wherein the data model is based on a software modernization ontology model defining a set of features and a set of constraints associated with each of the plurality of candidate software application architectures, and wherein the software modernization ontology model is defined using at least one of: the Resource Description Framework (RDF), a RDF Schema (RDFS), or the Web Ontology Language (OWL).

16. A computer-implemented method comprising:
obtaining profile data associated with a software application, wherein the profile data includes information describing a plurality of subunits of the software application and dynamic performance information associated with each of the plurality of subunits;
using a data model defining a plurality of software application architectures to identify a recommended software application architecture for a subunit of the plurality of subunits, wherein using the data model includes querying the data model using values from the profile data associated with the subunit of the plurality of subunits;
causing display of a graphical user interface (GUI) including an indication of the recommended software application architecture;
determining, based on the recommended software application architecture, a recommended modernization tool that can be used to modernize the software application to the recommended software application architecture; and
causing display in the GUI an indication of the recommended modernization tool.

17. The computer-implemented method of claim 16, wherein the recommended software application architecture is one of a plurality of software application architectures defined in the data model, and wherein the plurality of software application architectures is associated with a priority ordering, and wherein determining the recommended software application architecture includes:
querying the data model with values from the application profile data to identify a plurality of suitable software application architectures; and
applying the priority ordering to the suitable software application architectures to identifying the recommended software application architecture.

18. The computer-implemented method of claim 16, further comprising:

determining, based on the profile data, that a particular software application architecture is unsuitable for the software application based on a characteristic of the software application specified in the profile data; and wherein the GUI includes an indication of the characteristic of the software application and a recommendation for refactoring the software application to be suitable for the particular software application architecture.

19. The computer-implemented method of claim 16, wherein the recommended software application architecture is one of the plurality of software application architectures, and wherein the plurality of software application architectures includes at least one of: a serverless architecture, a microservices architecture, or a service-oriented application (SOA) architecture.

20. The computer-implemented method of claim 16, wherein the data model is based on at least one of:

a decision tree including representing a set of classification rules for the plurality of software application architectures, or a software modernization ontology model defining a set of features and a set of constraints associated with each of the plurality of software application architectures, and wherein the software modernization ontology model is defined using at least one of: the Resource Description Framework (RDF), a RDF Schema (RDFS), or the Web Ontology Language (OWL).

* * * * *